US007661696B1

(12) United States Patent
Acebo

(10) Patent No.: US 7,661,696 B1
(45) Date of Patent: Feb. 16, 2010

(54) WHEELED CHAIR

(75) Inventor: Alex Acebo, Hialeah, FL (US)

(73) Assignee: Revolutionary Wheelchair, Inc., Wilmington, DE (US)

( * ) Notice: Subject to any disclaimer, the term of this patent is extended or adjusted under 35 U.S.C. 154(b) by 0 days.

(21) Appl. No.: 11/564,602

(22) Filed: Nov. 29, 2006

(51) Int. Cl.
*B62B 7/00* (2006.01)

(52) U.S. Cl. .................... 280/647; 180/907; 280/250.1; 280/648; 297/330

(58) Field of Classification Search ............. 280/304.1, 280/250.1, 647, 648, 649, 650; 180/907; 297/330
See application file for complete search history.

(56) References Cited

U.S. PATENT DOCUMENTS

| | | | | |
|---|---|---|---|---|
| 2,849,051 | A | | 8/1958 | Streeter |
| 3,786,523 | A | | 1/1974 | Sele |
| 3,964,786 | A | * | 6/1976 | Mashuda .................... 297/300 |
| 4,679,259 | A | | 7/1987 | DiMatteo et al. |
| 4,691,962 | A | * | 9/1987 | Holdt .......................... 297/84 |
| D300,733 | S | | 4/1989 | Wagner |
| 4,819,283 | A | | 4/1989 | DiMatteo et al. |
| 4,856,123 | A | | 8/1989 | Henderson et al. |
| 4,949,408 | A | | 8/1990 | Trkla |
| 5,050,899 | A | * | 9/1991 | Stensby ................... 280/250.1 |
| 5,112,076 | A | | 5/1992 | Wilson |
| 5,179,745 | A | | 1/1993 | Hebert et al. |
| 5,193,633 | A | | 3/1993 | Ezenwa |
| 5,230,113 | A | | 7/1993 | Foster et al. |
| 5,380,034 | A | | 1/1995 | Wilson |
| 5,438,722 | A | | 8/1995 | Jayamanne |
| 5,520,403 | A | | 5/1996 | Bergstrom et al. |
| 5,596,775 | A | | 1/1997 | DiMatteo et al. |
| 5,645,313 | A | * | 7/1997 | Best et al. ..................... 297/84 |
| 6,089,593 | A | | 7/2000 | Hanson et al. |
| 6,131,215 | A | | 10/2000 | Lindell |

(Continued)

FOREIGN PATENT DOCUMENTS

WO WO 20051056376 A1 6/2005

OTHER PUBLICATIONS

Devon Recliner Rise and Recline Lift Chairs UK available at htt;://www.bakare.co.uk/Products/lift_chairs/recliner_lift_chair.html (last accessed Jun. 21, 2007).

(Continued)

*Primary Examiner*—Lesley Morris
*Assistant Examiner*—Marc A Scharich
(74) *Attorney, Agent, or Firm*—Nixon Peabody LLP

(57) ABSTRACT

A wheeled chair for assisting a user in changing a disposition. The chair comprises: a base member, a substantially planar seat member, a leg bracing member, a back bracing member, a bracing motor, and an actuator module. The base member includes a plurality of wheels and a lift device. The seat member is oriented substantially orthogonal to the direction of motion of the lift device. The leg bracing member includes a first mode wherein it extends downwardly from the seat member and a second mode wherein it extends substantially collinearly from the seat member. The back bracing member includes a first mode wherein it extends upwardly from the seat member and a second mode wherein it extends substantially collinearly from the seat member. The bracing motor changes between the two modes. The lift device includes a lift device motor. The actuator module activates the bracing and lift device motors simultaneously.

5 Claims, 3 Drawing Sheets

U.S. PATENT DOCUMENTS

| | | | | |
|---|---|---|---|---|
| 6,315,319 | B1 * | 11/2001 | Hanson et al. | 280/650 |
| 6,427,263 | B1 | 8/2002 | Lindell | |
| 6,499,163 | B1 * | 12/2002 | Stensby | 5/618 |
| 6,792,633 | B1 * | 9/2004 | Ito | 5/618 |
| 6,793,232 | B1 | 9/2004 | Wing | |
| 6,799,770 | B2 * | 10/2004 | Patrick et al. | 280/250.1 |
| 6,866,288 | B2 * | 3/2005 | Martin | 280/647 |
| 6,886,194 | B2 * | 5/2005 | Hodgetts | 5/86.1 |
| 6,957,461 | B2 * | 10/2005 | Osborne et al. | 5/618 |
| 7,069,608 | B2 * | 7/2006 | Failor et al. | 5/618 |
| 7,306,251 | B2 * | 12/2007 | Bright et al. | 280/304.1 |
| 2004/0174058 | A1 | 9/2004 | Meyer | |
| 2006/0220350 | A1 * | 10/2006 | Reef et al. | 280/650 |

OTHER PUBLICATIONS

TDX SP with Formula CG Powered Seating available at http://www.invacare.com/cgi-bin/imhgprd/inv__catalog/prod__cat__detai. . . (last accessed Jun. 21, 2007).

* cited by examiner

WHEELED CHAIR

BACKGROUND OF THE INVENTION

1. Field of the Invention

The present invention relates to wheeled chairs, specifically a wheeled chair for assisting a user in changing a disposition.

2. Description of the Related Art

People typically use devices which facilitate in the transport of invalids from place to place as well as enable the transfer of the invalid from such device to other functional devices such as a bed. It is known that many people require the use of wheelchairs. Often it is necessary for those in wheelchairs to need to recline. The change in position from vertical to any point between and including horizontal is often desirable to facilitate sleeping. Often it is necessary for invalids to be transferred from the wheelchair to a bed. Such transfer can be difficult whether or not one is assisted. There is a need for a device that safely, effectively and conveniently transport, facilitates different body positions, and enables simple transfer of the user from the chair to a bed. Some improvements have been made in the field. Examples include but are not limited to the references described below, which references are incorporated by reference herein:

U.S. Pat. No. 4,949,408, issued to Trkla, discloses an all purpose self powered wheelchair that permits the user to become self sufficient by permitting the user to move about, relieve themselves of bodily wastes, change their own bedpan, exercise, receive intravenous transfer of fluids, change positions, and also permits a person to assist the wheelchair user in transferring the wheelchair user from a bed to a wheelchair or from a wheelchair to a bed without the person having to lift the wheelchair user.

U.S. Pat. No. 5,230,113, issued to Foster et al., discloses a manually or automatically controlled adjusting bed-chair combination for persons suffering limited mobility due to accident, disease, or age who thus require intensive caregiving efforts by others. This portable body supporting device provides a patient with greater mobility and self-care even if he/she is confined therein for weeks, months, or longer. The bed-chair includes an upper frame for supporting the invalid's body in a large number of postures ranging from side, supine, sitting, reclining or standing. In turn, this upper frame is articulated by lower supporting frames powered by linear actuators, or the equivalent, and controlled by the patient control or the caregiver's override and automatically preset control to provide a timed regimen of turning or tilting according to the occupant's needs. Whether in bed or chair mode, the support frame consists of an upper body, middle and leg-foot segment. The mid-section provides a base to which the other two sections are pivotally mounted. Turning the middle section up to 20.degree.right or left relieves the local pressure on skin and other tissue yielding comfort and avoiding ulceration, cramping and discomfort. The optional accessories further increase the freedom of choice of more positions, actions, and controls, even to sensing difficulty and aiding excretion along with the option of using vibration and other therapeutic stimulations. The bed-chair's diverse positions enable easier entrance and exit. Ready disassembly into three or more sections facilitates transport. A mattress with special foam distributes the body weight over maximum area while cervical and lumbar supports plus adjustable edge tubes give security and comfort choice to abet healing.

U.S. Pat. No. 4,819,283, issued to DiMatteo et al., discloses an arrangement of a wheelchair with a movable seat and leg rest and a bed equipped with transfer apparatus provided with rollers, a movable sheet and lift arms, for transporting an invalid comfortably across the bed to a sitting position in the wheelchair. The invalid can also be transferred to a standing position at the end of the bed.

U.S. Pat. No. 5,596,775, issued to DiMatteo et al., discloses a patient transfer chair is disclosed which can be manually operated preferably by using a lever and spring helping device to assist in the transfer of a patient to and from a bed to and a wheelchair, chair, or other seat design. In transferring a patient from a chair to a bed, the lever is used by an attendant to assist the patient back and onto a transfer bed device. A spring helping device can be optionally used to assist in the transfer. Accordingly, a substantial reduction in the costs to design, manufacture, and operate a transfer chair is achieved while maintaining the same degree of comfort, safety and ease of prior patient transfer system designs.

U.S. Pat. No. 5,520,403, issued to Bergstrom et al., discloses a wheelchair having a set of features which facilitate transferring a patient to an alternative surface and raising the chair to an alternative seating height. The first of these features enables each of the handwheels to be independently pivoted rearward by raising its related arm rest. The motion of the wheel is over centering and its rearward position is determined by a brake pad which engages its respective handwheel. The rearward position of the handwheel is such as to clear the rear of the seat. The forward position is determined with the arm rest in the normal down position and latched to the frame. The second feature is a lifting mechanism for raising the patient to the level of an alternative surface such as a bed. The third feature has the seat surface fabricated from a moveable belt which laterally transports the patient to the alternative surface. The wheelchair also has an embodiment which allows folding for easy transport.

U.S. Pat. No. 4,679,259, issued to DiMatteo et al., discloses a reclinable wheelchair which operates in conjunction with a compatibly equipped bed to transport a supine person between the bed and the reclined wheelchair. The back rest can be raised and the leg rest lowered to place the person in a sitting position. Provisions are included for use with a toilet.

U.S. Patent Application Publication No.: 2004/0174058, by Meyer, discloses a raising wheel chair includes a raising frame with a lever parallelogram to maintain a backrest upright both in sitting and standing position of the user. A lever provides a movement of the backrest in such a way that no movement between the backrest and the body of the user takes place when a change from sitting to standing or lying takes place.

U.S. Design Pat. No.: 300,733, issued to Wagner, discloses an ornamental design for a wheelchair.

The inventions heretofore known suffer from a number of disadvantages which include expensive, cumbersome, difficult to use, complex, limited versatility, limited safety, limited durability, ergonomically deficient and/or otherwise fails to effectively transport, facilitate a wide range of body positions, and/or provide for convenient transfer from the wheeled chair to a bed.

What is needed is a wheeled chair that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available wheeled chairs. Accordingly, the present invention has been developed to provide a wheeled chair for assisting a user in changing a disposition.

There is one embodiment of a wheeled chair for assisting a user in changing a disposition. The chair may comprise: a base member that may have a plurality of wheels and a lift device selectably extendable upwardly from the base member; a substantially planar seat member that may be coupled to the lift device and/or may be oriented substantially orthogonal to the direction of motion of the lift device when the lift device is in operation; and a leg bracing member that may be rotatably coupled to the substantially planar seat member and extending therefrom. The leg bracing member may include: a first mode wherein the leg bracing member may extend downwardly from the substantially planar seat member and a second mode wherein the leg bracing member may extend substantially collinearly from the substantially planar seat member.

An embodiment of the wheeled chair may also comprise a back bracing member that may be rotatably coupled to the substantially planar seat member and/or may extend therefrom. The back bracing member may include: a first mode, wherein the back bracing member may extends upwardly from the substantially planar seat member and a second mode, wherein the back bracing member may extend substantially collinearly from the substantially planar seat member.

Another embodiment of the wheeled chair may further comprise a bracing motor that may be coupled to one of the leg bracing member and the back bracing member, and/or may be configured to selectably change such between the first mode and the second mode.

In yet another embodiment of the present invention, the lift device may include a lift device motor.

In still yet another embodiment of the present invention, the wheelchair may include an actuator module that may be coupled to the bracing motor and/or to the lift device motor, wherein the actuator module may selectably activate the bracing motor and the lift device motor simultaneously.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
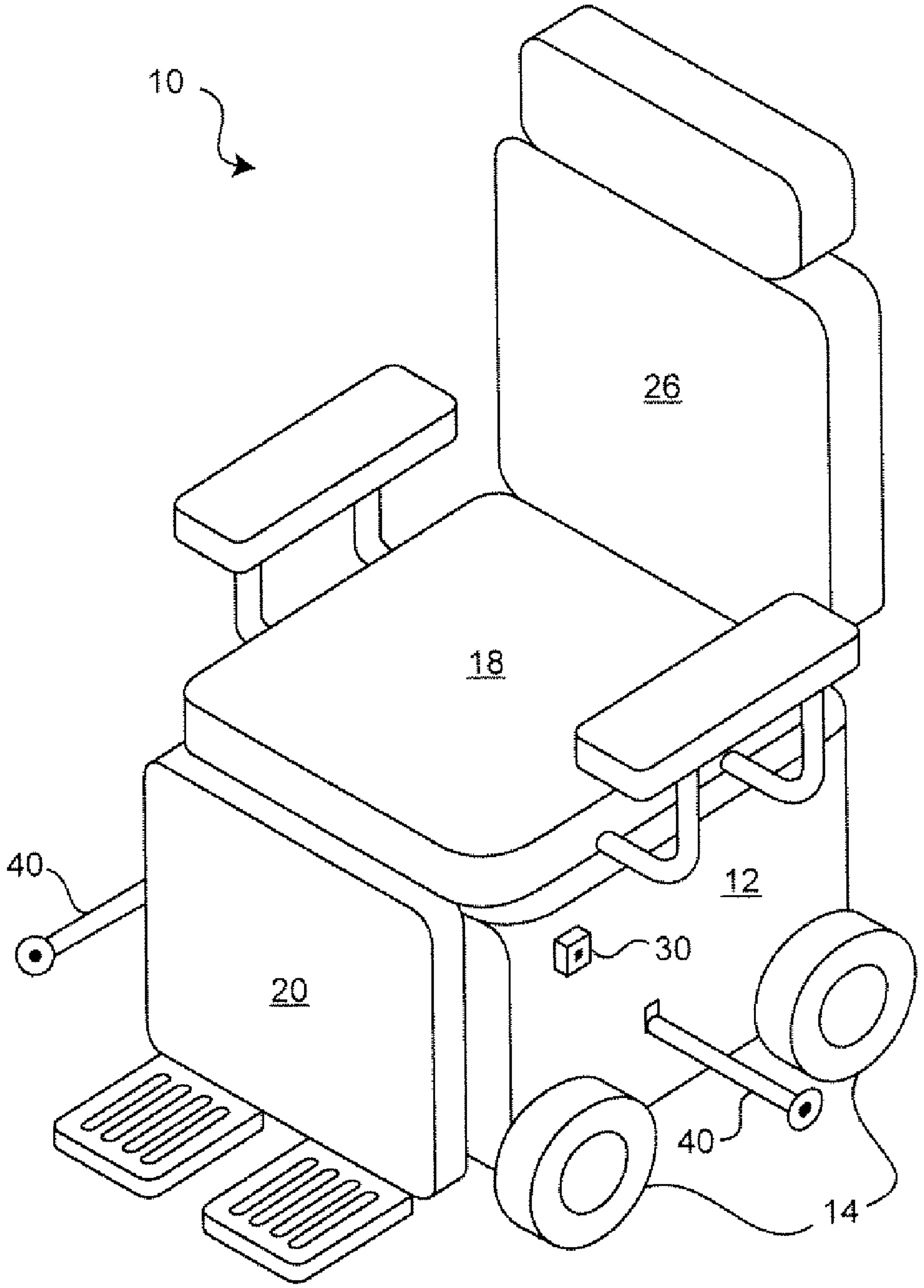
FIG. 1 illustrates a perspective view of a wheeled chair, according to one embodiment of the invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

As used herein, "comprising," "including," "containing," "is, are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

Looking to the drawing figures, there is an illustrated embodiment of a wheeled chair 10 for assisting a user in changing a disposition. The chair, as shown in the Figures, comprises a base member 12 having a plurality of wheels 14 and a lift device 16 described in U.S. Patent Application Publication No.: 2004/0174058, by Meyer, which is incorporated by reference herein. The lift device is configured to be selectably extendable upwardly from the base member 12. The lift device 16 includes a direct current (DC) lift device motor 30, as one skilled in the art would appreciate, adapted to be electrically actuated, thereby changing a length 15 of the lift device, as indicated by arrow 17. As the length 15 changes, the effective height of the wheeled chair 10 changes. In one embodiment, there is also a substantially planar seat member 18 coupled to the lift device and is oriented substantially orthogonal to the direction of motion of the lift device when the lift device is in operation; and a leg bracing member 20 rotatably coupled to the seat member and extending therefrom, and configured to support a user's legs. The leg bracing member 20 includes: a first mode 22, wherein the leg bracing member extends downwardly from the seat member 18 and a second mode 24, wherein the leg bracing member extends substantially collinearly from the seat member, thereby forming a horizontal surface that resembles a bed.

An embodiment of the wheeled chair 10 also comprises a back bracing member 26 rotatably coupled to the seat member 18 and extending therefrom, and adapted to support a user's back. The back bracing member 26 includes: a first mode 22, wherein the back bracing member extends upwardly from the seat member 18 and a second mode 24, wherein the back bracing member extends substantially collinearly from the seat member.

Another embodiment of the wheeled chair 10 further comprises a bracing motor 28, wherein one skilled in the art would appreciate that such motor is substantially similar the type of motors employed to provide DC electrical power to actuate recliner chairs. The bracing motor 28 is electrically coupled to the leg bracing member 20 and back bracing member 26, and is configured to selectably change such between the first mode 22 and second mode 24. When the bracing members 20, 26 are in the first mode 22, the wheeled chair resembles a recliner.

In yet another embodiment of the present invention, the wheelchair 10 includes an actuator module or switch 32 such as a SPDT Slide Switch, Rapid Electronics Limited, Severalls Lane, Colchester, Essex C04 5JS United Kingdom, coupled to the bracing motor 28 and lift device motor 30, wherein the actuator module 32 selectably activates the motors 28, 30 simultaneously to the change modes 22, 24 of the bracing members 20, 26. In one embodiment, one skilled in the art would appreciate that a user may employ 12-volt batteries or the like to provide DC power to the motors 28, 30.

Figure 2:
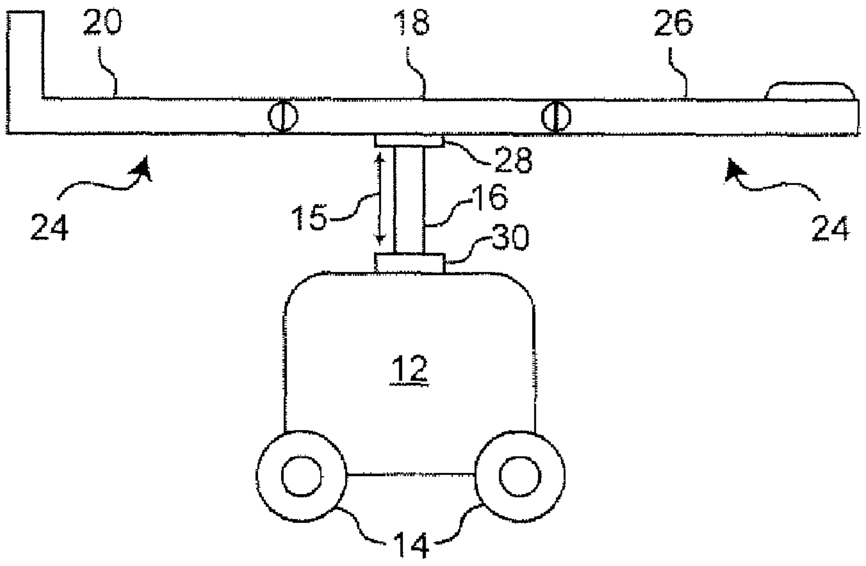
FIG. 2 illustrates a side elevational view of a wheeled chair, according to one embodiment of the invention.
Figure 3:
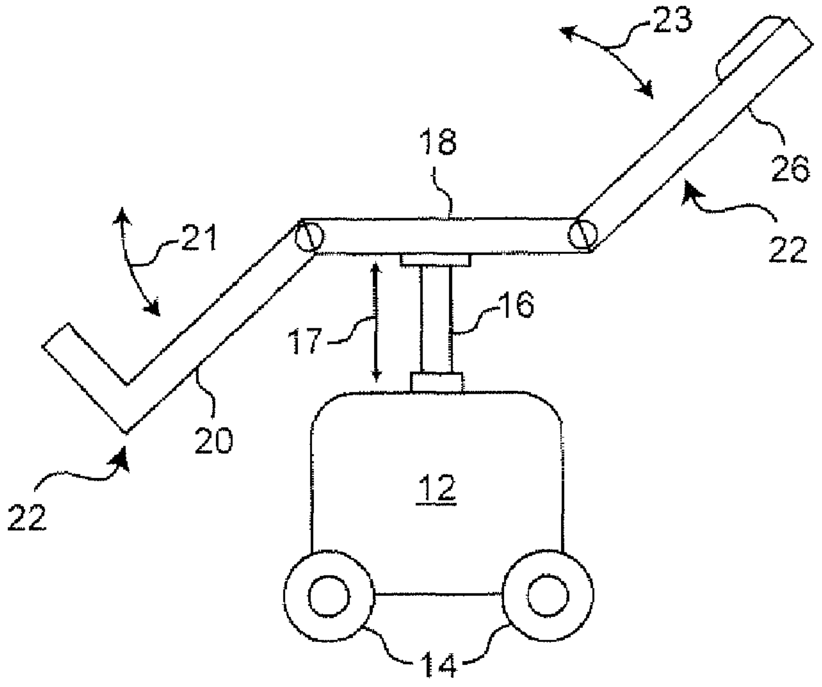
FIG. 3 illustrates a side elevational view of a wheeled chair, according to one embodiment of the invention.
Figure 4:
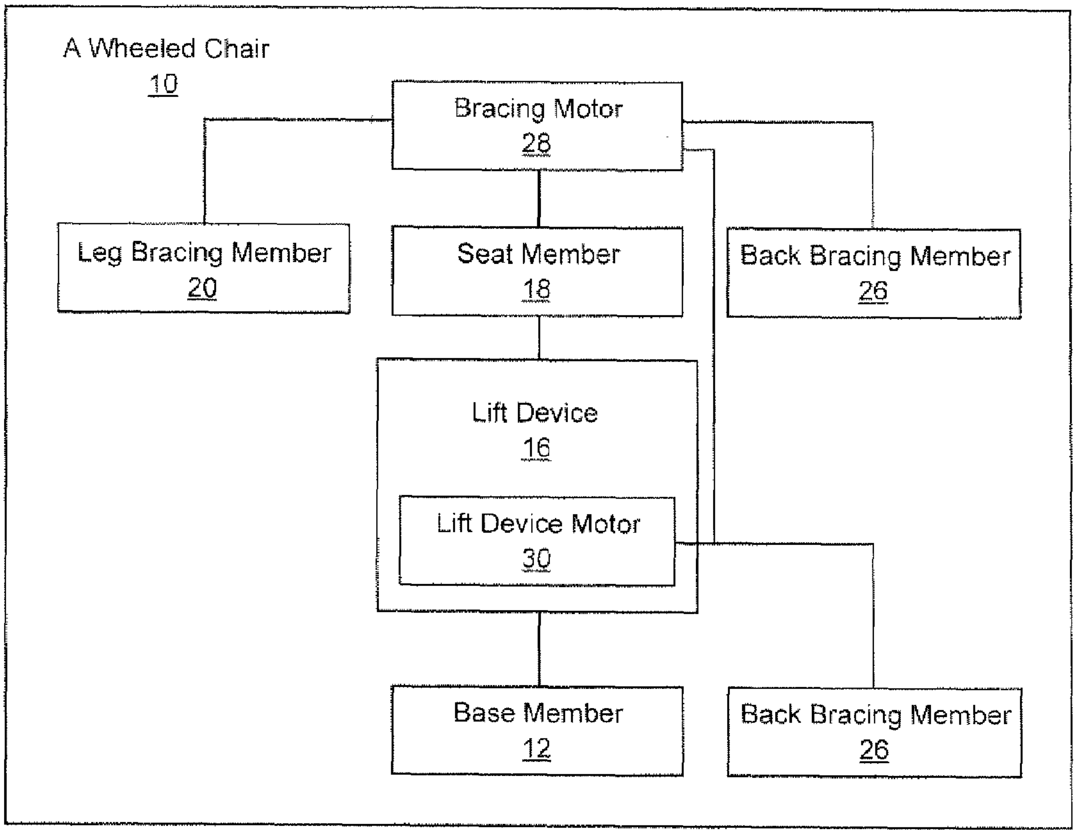
FIG. 4 illustrates a block diagram of a wheeled chair, according to one embodiment of the invention.

In operation of the illustrated embodiment shown in FIGS. 1-3, a user may manipulate the actuator module or switch 32 to interchangeably activate the motors 28, 30 as a means to either selectably extend the length of the lift device 16 to change the effective height of the wheelchair or selectably position the bracing members 20, 26 simultaneously in a plurality of modes 22, 24 allowing the user to selectably sit, recline, or lay down on the wheelchair 10. The user may also be conveniently transported on the wheelchair 10 from one location to another on wheels 14.

In operation of one embodiment as shown in FIG. 2, let's assume a handicapped individual is sitting in the wheelchair 10 at a medical treatment facility, and the individual needs to be transferred from the wheel chair to a bed. Either the medical treatment personnel or the individual may selectably manipulate the actuator switch 32 to place the wheeled chair in the mode 24, wherein the bracing members 20, 26 are in a position collinear with the seat member 18, thereby forming a horizontal flat surface that resembles a bed. The user may also use the actuation module to activate the lift device motor, independent of the bracing motor, in order to extend the length of the lift device 16 to position the wheelchair 10 to a given height that corresponds to a particular height of the bed. At this point, the individual may be conveniently rolled from the wheeled chair on to a bed in a safe manner.

In operation of one embodiment as shown in FIG. 3, let's assume a handicapped individual is sitting in the wheelchair 10 at a medical treatment facility, and the individual desires use the wheeled chair 10 as a recliner to watch a television program or read a book in his or her designated room. Either the medical treatment personnel or the individual may manipulate the actuator switch 32 such as a slide electrical switch, etc. to simultaneously place the wheeled chair 10 in the mode 22, the leg bracing member 20 extends downwardly from the seat member 18 and the back bracing member 26 extends upwardly from the seat member 18, respectively, thereby forming a recliner where the individual may comfortably watch television or read a book.

In still yet another embodiment of the present invention, wheeled chair 10 may include hardware features such as adjustable arm height mechanisms, customized wheel sizing, anti-tip stability outriggers 40, etc. to help maintain balance of the wheeled chair and prevent tip over of the chair during when maneuvered from one location to another.

Embodiments of the wheeled chair 10 fulfill the need for a wheeled chair that would allow a user to get in and out of the chair unassisted to and from a bed with a roll-over or crawl-over maneuver. This is especially useful for severely handicapped people or elderly people that are unable to freely move around.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

Although FIG. 1 illustrates the actuator switch 32 being disposed on the base member 12 near the front of the wheeled chair 10, one skilled in the art would appreciate that the module may be disposed anywhere on the base member or elsewhere on the wheeled chair, according to alternative embodiments.

It is envisioned that one skilled in the art may appreciate that the bracing members 20, 26 may be actuated to a mode 22, wherein they are positioned at various angles downward and/or upward relative to the horizontal position of the seat member 18, shown in FIG. 3.

It is also envisioned that lift device motor 30 may be mechanically, hydraulically, or electrically actuated to extend the effective length of the lift device 16, according to various embodiments.

It is expected that there could be numerous variations of the design of this invention. An example is that the base member 12; wheels 14; lift device 16; seat member 18; bracing members 20, 26; motors 28; 30; and/or actuator switch 32 may vary in length, width, size, design, color, thickness, shape, diameter, etc., according to various embodiments.

Finally, it is envisioned that the components of the device may be constructed of a variety of materials, such as foam material, nylon, leather, rubber, fabric, plastic, composite material, steel, metal alloys, etc.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A wheeled chair system comprising:

a base member comprising a plurality of wheels and a lift device selectably extendable upwardly from and integrated with the base member, the lift device including a lift device motor;

a substantially planar seat member coupled to the lift device and oriented substantially orthogonal to the direction of motion of the lift device when the lift device is in operation;

a leg bracing member rotatably coupled to the substantially planar seat member and extending therefrom, including a first mode wherein the leg bracing member extends downwardly from the substantially planar seat member and a second mode wherein the leg bracing member extends substantially collinearly from the substantially planar seat member;

a back bracing member rotatably coupled to the substantially planar seat member and extending therefrom, including a first mode wherein the back bracing member extends upwardly from the substantially planar seat member and a second mode wherein the back bracing member extends substantially collinearly from the substantially planar seat member;

a single bracing motor operably coupled to the leg bracing member and the back bracing member to move at least one of the back bracing member and the leg bracing member between corresponding first and second modes, the bracing motor being located directly underneath the planar seat member; and an actuator module coupled to the bracing motor and to the lift device motor, wherein the actuator module selectably activates the bracing motor and the lift device motor simultaneously.

2. The system of claim 1 further comprising a stability system that provides stability during movement in the corresponding first and second modes.

3. The system of claim 2 wherein the stability system comprises one or more anti-tip stability outriggers.

4. The system of claim 1 wherein at least one of the bracing motor and the lift device motor is powered by a battery.

5. The system of claim 1 wherein at least one of the bracing motor and the lift device motor is a direct current (DC) motor.

* * * * *